(12) United States Patent
Lee et al.

(10) Patent No.: US 11,197,293 B2
(45) Date of Patent: Dec. 7, 2021

(54) METHOD FOR TRANSMITTING OR RECEIVING UPLINK CONTROL INFORMATION IN WIRELESS COMMUNICATION SYSTEM AND DEVICE THEREFOR

(71) Applicant: LG ELECTRONICS INC., Seoul (KR)

(72) Inventors: Hyunho Lee, Seoul (KR); Seungmin Lee, Seoul (KR); Daesung Hwang, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 595 days.

(21) Appl. No.: 16/087,064

(22) PCT Filed: Mar. 30, 2017

(86) PCT No.: PCT/KR2017/003452
§ 371 (c)(1),
(2) Date: Sep. 20, 2018

(87) PCT Pub. No.: WO2017/171413
PCT Pub. Date: Oct. 5, 2017

(65) Prior Publication Data
US 2021/0204282 A1 Jul. 1, 2021

Related U.S. Application Data

(60) Provisional application No. 62/334,379, filed on May 10, 2016, provisional application No. 62/315,066, filed on Mar. 30, 2016.

(51) Int. Cl.
*H04J 3/00* (2006.01)
*H04W 72/04* (2009.01)
(Continued)

(52) U.S. Cl.
CPC ....... *H04W 72/0446* (2013.01); *H04L 5/0055* (2013.01); *H04W 72/042* (2013.01); *H04W 72/10* (2013.01)

(58) Field of Classification Search
CPC ............. H04W 72/0446; H04W 72/10; H04W 72/042; H04L 5/0055
(Continued)

(56) References Cited

U.S. PATENT DOCUMENTS

2013/0039321 A1   2/2013   Kim et al.
2013/0195045 A1   8/2013   Papasakellariou et al.
(Continued)

OTHER PUBLICATIONS

Huawei et al., "Short TTI for DL transmissions", R1-160292, Feb. 15-19, 2016 (From Applicant's IDS) (Year: 2016).*
(Continued)

*Primary Examiner* — Mang Hang Yeung
(74) *Attorney, Agent, or Firm* — Lee Hong Degerman Kang & Waimey

(57) ABSTRACT

A method for transmitting an uplink signal for a terminal configured to support at least one transmission time interval (TTI) length in a wireless communication system, according to one embodiment of the present invention, is performed by the terminal and comprises the steps of: receiving, in multiple downlink cells, a downlink data channel; and transmitting, in at least one uplink cell, uplink control information for the downlink data channel, wherein the at least one uplink cell corresponds to at least one of the multiple downlink cells, and downlink cells having the same TTI length or a TTI length of one group may correspond to one uplink cell.

12 Claims, 6 Drawing Sheets

(51) Int. Cl.
*H04L 5/00* (2006.01)
*H04W 72/10* (2009.01)

(58) Field of Classification Search
USPC .......................................................... 370/336
See application file for complete search history.

(56) References Cited

U.S. PATENT DOCUMENTS

| 2015/0092645 | A1* | 4/2015 | Tabet | H04L 1/1671 |
| | | | | 370/311 |
| 2016/0338052 | A1* | 11/2016 | Ji | H04L 1/12 |
| 2017/0223670 | A1* | 8/2017 | Chen | H04L 5/0053 |

OTHER PUBLICATIONS

Huawei et al., "Short TTI for UL transmissions", R1-160294, Feb. 15-19, 2016 (From Applicant's IDS) (Year: 2016).*
Qualcomm, "TTI shortening and reduced processing time for UL transmission", R1-160906, Feb. 15-19, 2016 (From Applicant's IDS) (Year: 2016).*
PCT International Application No. PCT/KR2017/003452, Written Opinion of the International Searching Authority dated Jul. 11, 2018, 17 pages.
Huawei, et al., "Short TTI for DL transmissions", 3GPP TSG RAN WG1 Meeting #84, R1-160292, Feb. 2016, 8 pages.
Huawei, et al., "Short TTI for UL transmissions", 3GPP TSG RAN WG1 Meeting #84, R1-160294, Feb. 2016, 5 pages.
Qualcomm, "TTI shortening and reduced processing time for UL transmissions", 3GPP TSG RAN WG1 Meeting #84, R1-160906, Feb. 2016, 6 pages.

* cited by examiner

METHOD FOR TRANSMITTING OR RECEIVING UPLINK CONTROL INFORMATION IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2017/003452, filed on Mar. 30, 2017, which claims the benefit of U.S. Provisional Application Nos. 62/315,066, filed on Mar. 30, 2016 and 62/334,379, filed on May 10, 2016, the contents of which are all hereby incorporated by reference herein in their entireties.

TECHNICAL FIELD

The present invention relates to a wireless communication system, and more particularly, to a method of transmitting or receiving uplink control information in a wireless communication system and an apparatus therefor.

BACKGROUND ART

In a wireless cellular communication system, discussion on a transmission/reception method capable of reducing latency as much as possible is in progress. In particular, according to the method, data is transmitted as soon as possible within a short time period using a short TTI (transmission time interval) for a service/UE sensitive to latency and a response is transmitted within a short time period in response to the data. On the contrary, it is able to transmit/receive data using a longer TTI for a service/UE less sensitive to latency. For a service/UE sensitive to power efficiency rather than latency, it may be able to repeatedly transmit data using the same low power or transmit data by more extending a TTI. The present invention proposes a method of allocating, transmitting, or receiving an uplink control information resource that enables the operations above to be performed.

DISCLOSURE OF THE INVENTION

Technical Task

The present invention proposes a method of allocating, transmitting, or receiving an uplink control information resource in a wireless communication system and an operation related to the method.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting an uplink signal, which is transmitted by a terminal configured to support one or more TTI (Transmission Time Interval) lengths in a wireless communication system, may include receiving a downlink data channel in a plurality of downlink cells and transmitting uplink control information on the downlink data channel in at least one uplink cell, the at least one uplink cell may correspond to at least one of a plurality of the downlink cells and downlink cells of the same TTI length or a TTI length belonging to a group may correspond to a single uplink cell.

Additionally or alternatively, a TTI length of the at least one uplink cell may be configured according to the TTI length or the TTI length group of the downlink cells.

Additionally or alternatively, when the terminal receives a downlink control signal for uplink transmission on a specific uplink cell, the at least one uplink cell may be determined as the specific uplink cell, HARQ (hybrid automatic retransmission request)-ACK (acknowledgement) among the uplink control information may be transmitted on an uplink control channel with a short TTI of the specific uplink cell, and CSI (channel state information) may be transmitted on an uplink data channel with a short TTI of the specific uplink cell.

Additionally or alternatively, when the terminal receives a downlink control signal for performing uplink transmission in a specific uplink cell, the at least one uplink cell may be determined as the specific uplink cell and the uplink control information may be transmitted on an uplink data channel with a short TTI of the specific uplink cell.

Additionally or alternatively, whether or not a transmission is performed on the uplink data channel of the short TTI can be determined according to TTI lengths of the plurality of downlink cells.

Additionally or alternatively, when a TTI length of a downlink cell in which the downlink data channel is received is shorter than a TTI length of an uplink cell in which uplink control information on the received downlink data channel is to be transmitted, an uplink control channel including the uplink control information may be transmitted in an uplink TTI including a TTI of the downlink cell at the uplink control information transmission timing on the basis of the TTI length of the downlink cell.

Additionally or alternatively, when a plurality of uplink control information correspond to the uplink TTI, a transmission of a downlink data channel with a shortest TTI length may have a priority.

Additionally or alternatively, when uplink control information of two or more downlink data channels among the plurality of downlink data channels correspond to the uplink TTI, the two or more uplink control information can be transmitted in a manner of being bundled or multiplexed.

To further achieve these and other advantages and in accordance with the purpose of the present invention, according to a different embodiment, a terminal configured to support one or more TTI (Transmission Time Interval) lengths and transmit an uplink signal in a wireless communication system includes a transmitter and a receiver, and a processor that controls the transmitter and the receiver, the processor receives a downlink data channel in a plurality of downlink cells, transmits uplink control information on the downlink data channel in at least one uplink cell, the at least one one uplink cell may correspond to at least one of a plurality of the downlink cells and downlink cells of the same TTI length or a TTI length belonging to a group may correspond to a single uplink cell.

Additionally or alternatively, a TTI length of the at least one uplink cell may be configured according to the TTI length or the TTI length group of the downlink cells.

Additionally or alternatively, when the terminal receives a downlink control signal for performing uplink transmission in a specific uplink cell, the at least one uplink cell may be determined as the specific uplink cell, HARQ (hybrid automatic retransmission request)-ACK (acknowledgement) among the uplink control information may be transmitted on an uplink control channel of a short TTI of the specific uplink cell, and CSI (channel state information) may be transmitted on an uplink data channel with a short TTI of the specific uplink cell.

Additionally or alternatively, when the terminal receives a downlink control signal for uplink transmission in a specific uplink cell, the at least one uplink cell may be determined as the specific uplink cell and the uplink control information may be transmitted on an uplink data channel with a short TTI of the specific uplink cell.

Additionally or alternatively, whether or not a transmission is performed on the uplink data channel of the short TTI may be determined according to TTI lengths of the plurality of downlink cells.

Additionally or alternatively, when a TTI length of a downlink cell in which the downlink data channel is received is shorter than a TTI length of an uplink cell in which uplink control information for the received downlink data channel is to be transmitted, an uplink control channel including the uplink control information may be transmitted in an uplink TTI including a TTI of the downlink cell at the uplink control information transmission timing on the basis of the TTI length of the downlink cell.

Additionally or alternatively, when a plurality of uplink control information correspond to the uplink TTI, a transmission of a downlink data channel having a shortest TTI length may have a priority.

Additionally or alternatively, when uplink control information of two or more downlink data channels among the plurality of downlink data channels correspond to the uplink TTI, the two or more uplink control information may be transmitted in a manner of being bundled or multiplexed.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

According to one embodiment of the present invention, it is able to make mapping, transmission or reception of uplink control information to be efficiently performed in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
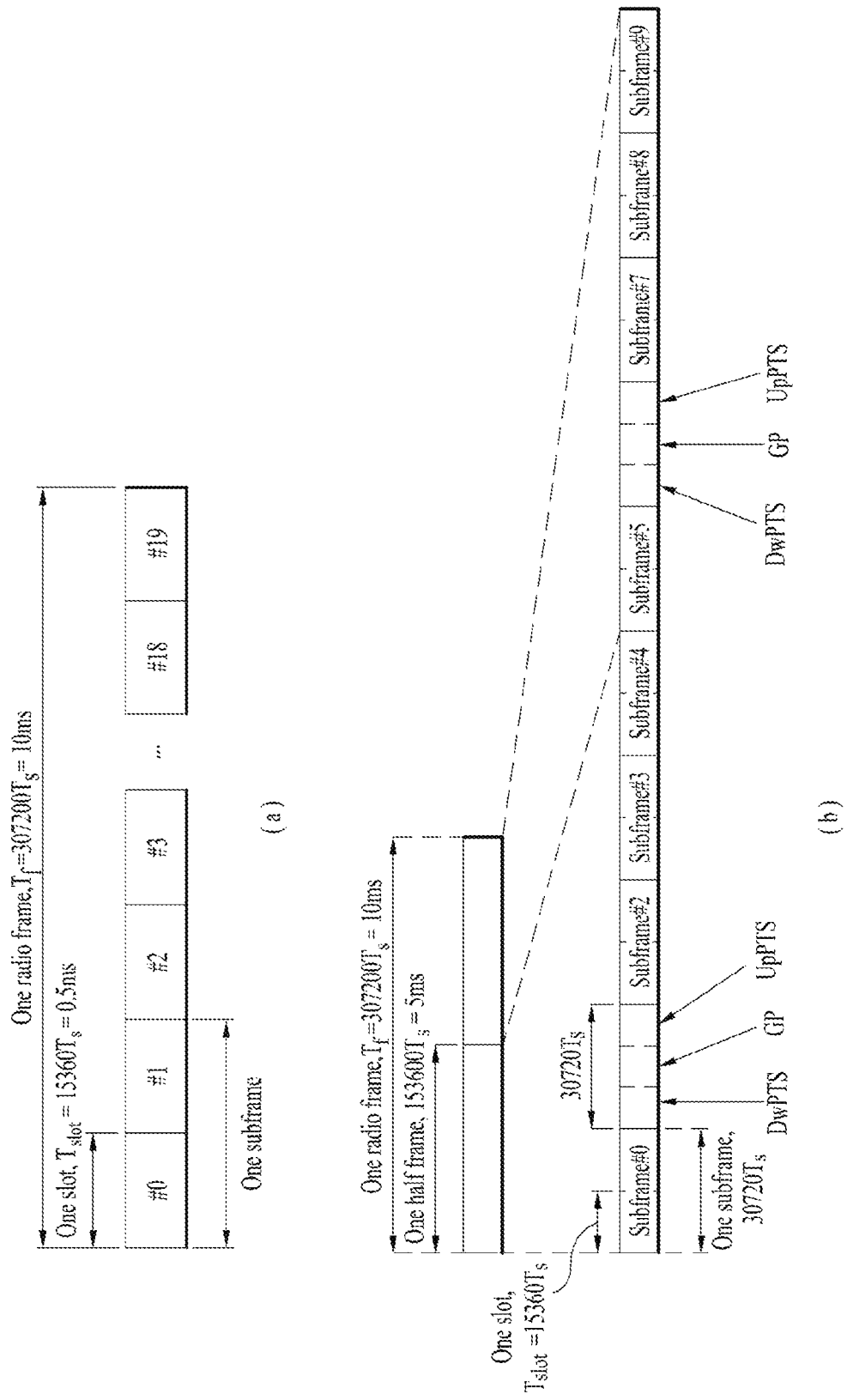
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e., single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g., a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configu-ration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$  | 2192 · $T_s$ | 2560 · $T_s$ | 7680 · $T_s$  | 2192 · $T_s$ | 2560 · $T_s$ |
| 1 | 19760 · $T_s$ |              |              | 20480 · $T_s$ |              |              |
| 2 | 21952 · $T_s$ |              |              | 23040 · $T_s$ |              |              |
| 3 | 24144 · $T_s$ |              |              | 25600 · $T_s$ |              |              |
| 4 | 26336 · $T_s$ |              |              | 7680 · $T_s$  | 4384 · $T_s$ | 5120 · $T_s$ |
| 5 | 6592 · $T_s$  | 4384 · $T_s$ | 5120 · $T_s$ | 20480 · $T_s$ |              |              |
| 6 | 19760 · $T_s$ |              |              | 23040 · $T_s$ |              |              |
| 7 | 21952 · $T_s$ |              |              | 12800 · $T_s$ |              |              |
| 8 | 24144 · $T_s$ |              |              | —             | —            | —            |
| 9 | 13168 · $T_s$ |              |              | —             | —            | —            |

Figure 2:
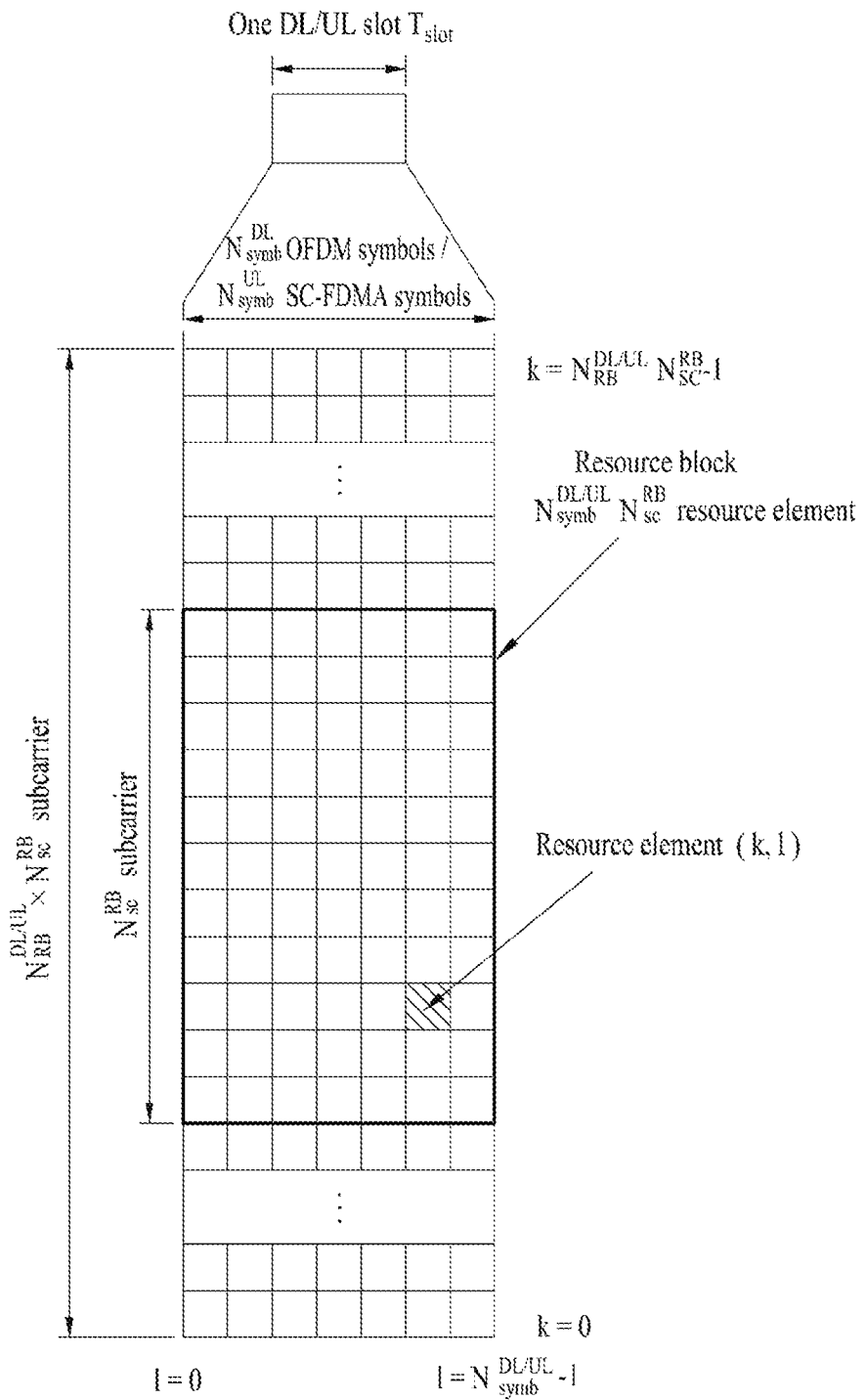
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
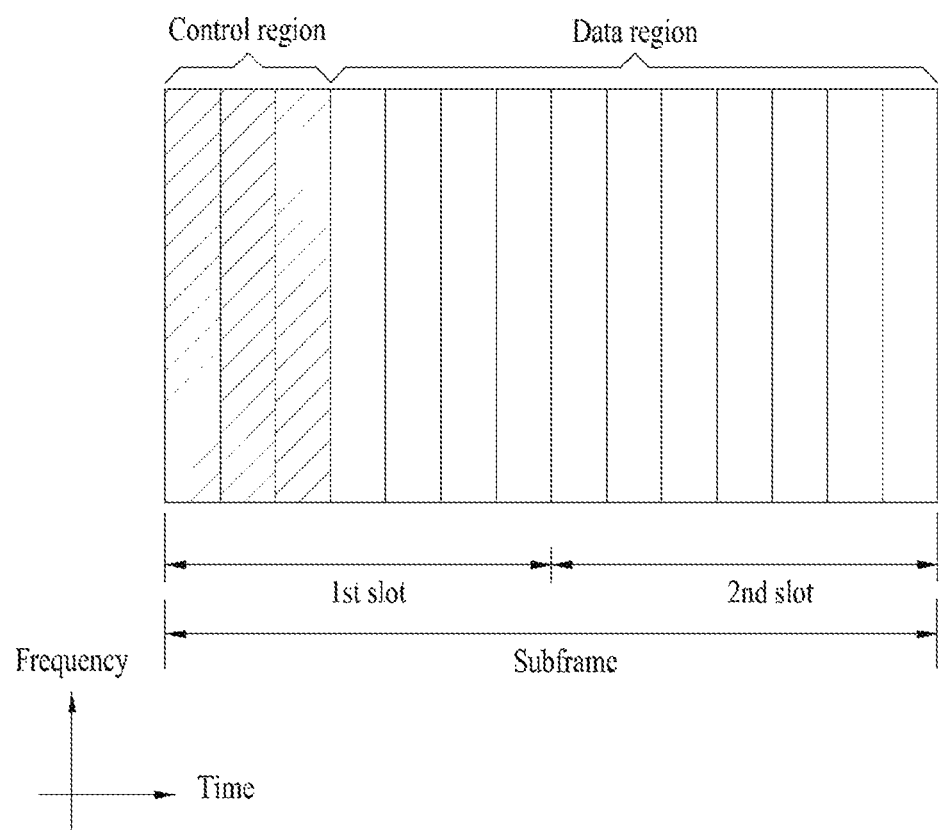
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
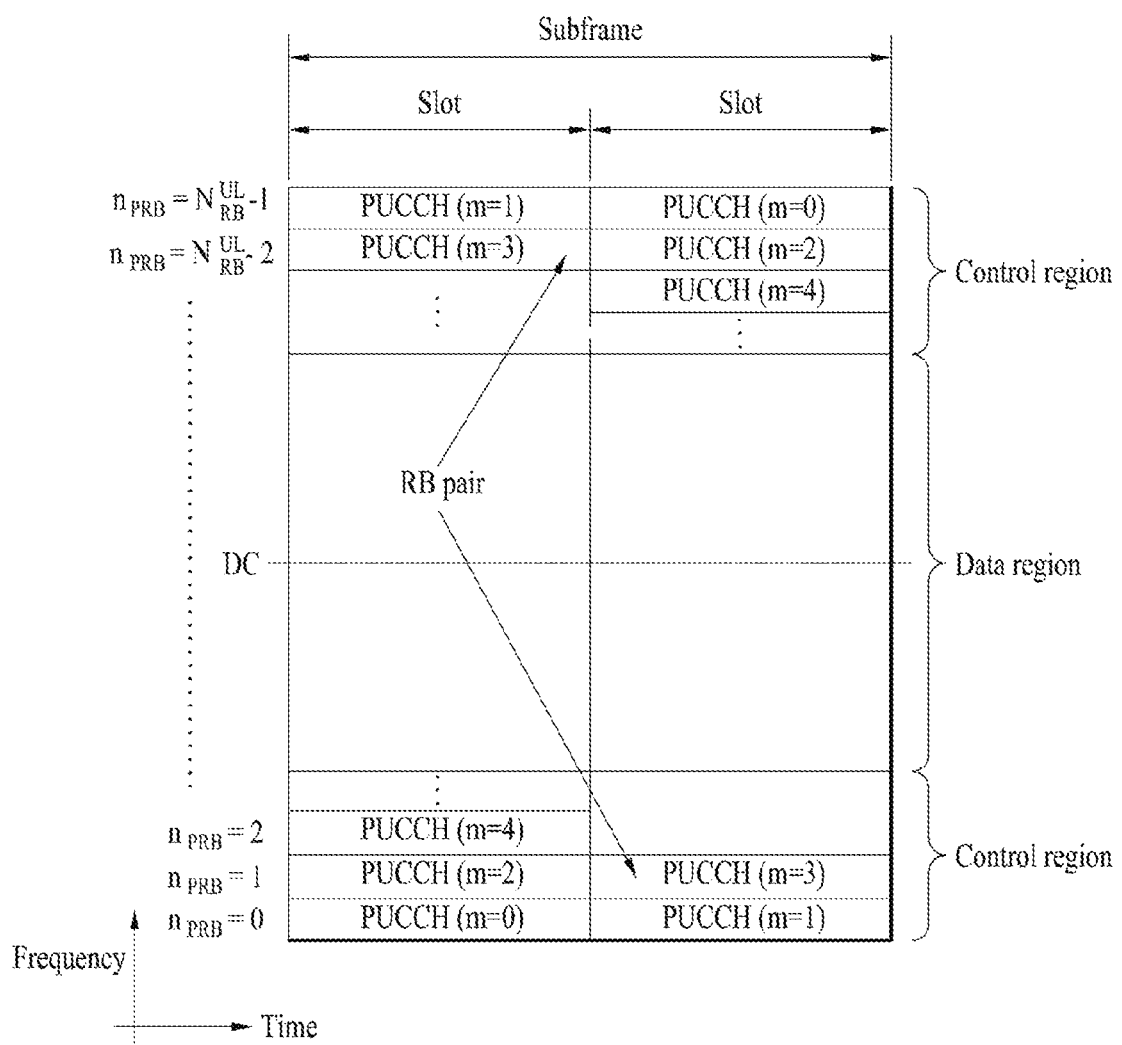
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A(exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

The present invention relates to a method of providing a plurality of different services in a system by applying a different service parameter according to a service or a UE to satisfy a requirement of each of a plurality of the services. In particular, the present invention relates to a method of reducing latency as much as possible by transmitting data as soon as possible during a short time period using a short TTI (transmission time interval) for a service/UE sensitive to latency and transmitting a response within short time in response to the data. On the contrary, it may transmit and receive data using a longer TTI for a service/UE less sensitive to the latency. For a service/UE sensitive to power efficiency rather than the latency, it may repetitively transmit data with the same lower power or transmit data using a lengthened TTI. The present invention proposes a method of transmitting control information and a data signal for enabling the abovementioned operation and a multiplexing method.

For clarity, 1 ms currently used in LTE/LTE-A system is assumed as a basic TTI. A basic system is also based on LTE/LTE-A system. When a different service/UE is provided in a base station of LTE/LTE-A system based on a TTI of 1 ms (i.e., a subframe length), a method of transmitting a data/control channel having a TTI unit shorter than 1 ms is proposed for a service/UE sensitive to latency. In the following, a TTI of 1 ms is referred to as a normal TTI, a TTI of a unit smaller than 1 ms (e.g., 0.5 ms) is referred to as a short TTI, and a TTI of a unit longer than 1 ms (e.g., 2 ms) is referred to as a long TTI.

And, a short TTI can also be represented by the number of symbols. As mentioned in the foregoing description, in LTE/LTE-A system, one slot corresponds to 0.5 ms. In case of using a normal CP, one slot includes 7 symbols. In particular, in case of using a normal CP, a short TTI can include symbols less than 7 symbols. For example, it may be able to configure a short TTI of 2 symbols, a short TTI of 4 symbols, and the like.

Figure 5:
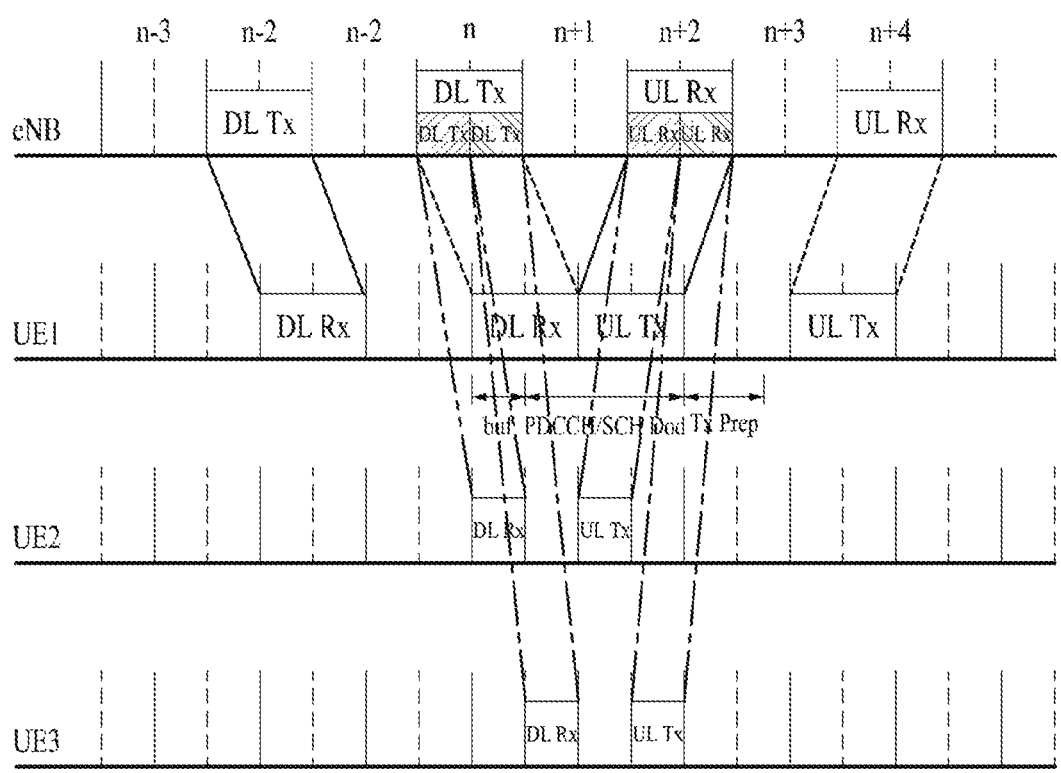
FIG. 5 is a diagram illustrating DL reception timing and UL transmission timing of UEs operating with a different TTI (transmission time interval)

First of all, a method of supporting a short TTI of a unit shorter than 1 ms in a system basically using a normal TTI of 1 ms unit used in legacy LTE/LTE-A system is described. First of all, downlink (DL) is explained. Multiplexing between channels having a different TTI size in an eNB and an example of uplink (UL) transmission for the multiplexing are shown in FIG. 5. As a TTI is getting shorter, time taken for a UE to buffer and decode a control channel and a data channel is getting shorter. Time taken for performing UL transmission in response to the control channel and the data channel is getting shorter. As shown in the example of FIG. 5, in case of transmission of 1 ms TTI, when a DL channel is transmitted in a specific $n^{th}$ subframe, an eNB can receive a response in an $(n+4)^{th}$ subframe in response to the DL channel In case of transmission of 0.5 TTI, when a DL channel is transmitted in a specific $n^{th}$ subframe, an eNB can receive a response in an $(n+2)^{th}$ subframe in response to the DL channel In particular, in order to support TTIs of a different length, it is necessary to support backward compatibility to prevent an impact on a UE operating in a legacy system only for DL and UL multiplexing of channels having a different TTI.

In a next system, it may consider a situation that a TTI is variously set to all physical channels or a specific physical channel to satisfy requirements in various application fields. More specifically, in case of 3GPP LTE system, it may be able to configure a TTI corresponding to a unit applied to transmission of a physical channel such as PDSCH/PUSCH/PUCCH to be shorter than 1 msec to reduce latency when communication is performed between an eNB and a UE according to a scenario. And, when a plurality of physical channels exist within a single subframe (e.g., 1 msec) for a single UE or multiple UEs, a TTI can be differently applied to each of a plurality of the physical channels. In the following description of the present invention, for clarity, LTE (LTE-A) system is explained as an example. However, it is apparent that the present invention is applied not only to the LTE (LTE-A) system but also to a communication system to be developed in the future. In this case, a TTI may correspond to 1 msec (i.e., normal TTI) as a normal subframe size in LTE system. A short TTI (i.e., sTTI) corresponds to a value smaller than 1 msec. The sTTI may correspond to a single/multiple OFDM or SC-FDMA symbol unit, by which the present invention may be non-limited. And, a UL data channel and a UL control channel transmitted within the sTTI are referred to as an sPUSCH and an sPUCCH, respectively.

For clarity, the present invention is explained on the basis of LTE. However, contents of the present invention can also be applied to a technology using a different waveform/frame structure such as new RAT, and the like. Or, when a system supports one or more subcarrier spacing, a TTI length may vary. In this case, a similar concept can be applied to perform multiplexing between TTI lengths. For example, if there are subcarrier spacing of X and subcarrier spacing of 2 * X, it can be similarly handled with a case that a single subframe is divided into two sTTIs.

When duplex modes different from each other or a plurality of CCs (component carriers) of the same duplex mode are aggregated with each other and it is able to support a single TTI length or a plurality of TTI lengths different from 1 ms TTI (e.g., shorter than 1 ms) in a legacy LTE/LTE-A system, the present invention proposes a method for a UE to transmit UCI.

UCI Transmission according to CA (Carrier Aggregation) Case

When CA and sTTI are supported, a method of transmitting UCI (e.g., HARQ-ACK, CSI, etc.) on a plurality of cells according to a DL/UL CA condition is proposed as follows.

UCI Transmission Method

Case 1: DL CA & UL non-CA case

Proposal 1: (s)PUCCH is transmitted using a TTI length corresponding to a Pcell irrespective of a TTI length of a DL TTI.

Proposal 2: In case of UCI corresponding to a specific DL cell, (s)PUCCH is transmitted using a TTI length set to the DL cell. In this case, (s)PUCCH including the entire UCI can be transmitted using a shorter TTI length. Or, UCI on cells having a different TTI length can be transmitted in a manner of being TDM (Time Division Multiplexing).

In this case, TDM transmission of UCI can be defined as follows irrespective of the classification of CA cases. UCI as much as "the predefined number of cells" or UCI as much as "the maximum number of cells satisfying a prescribed coding rate in consideration of payload" are preferentially included in (s)PUCCH transmission in an ascending order of cell indexes (or in a descending order of cell indexes or for cells selected according to a predefined/predetermined rule only) and UCI on the remaining cells can be offloaded to a next TTI (or a TTI appearing after predetermined time). For example, when HARQ-ACK transmission timing of cells 1 and 2 corresponds to a TTI #n, HARQ-ACK for the cell 1 is transmitted at the TTI #n and HARQ-ACK for the cell 2 is transmitted at TTI #n+1. Or, UCI of a higher priority can be preferentially included in sPUCCH transmission according to a priority of the UCI and the remaining UCI can be offloaded to a next TTI (or a TTI appearing after predetermined time). In the foregoing description, a coding rate for determining the number of UCI can be differently configured according to a TTI length or a TTI group. The coding rate can be defined or promised in advance or can be set to a UE via higher layer/physical layer signaling. In this case, a single TTI group can be defined by a set of multiple TTI lengths different from each other.

Proposal 3: Assume that a UL TTI length is determined according to a TTI length set to a UL carrier and transmission is performed according to the UL TTI length. If the configuration above does not exist, a DL short TTI length set to a Pcell is assumed (if configured). Otherwise, a UL TTI length is determined according to a default TTI length of the Pcell.

Proposal 3-1: When a reference TTI length is configured, the TTI length may correspond to a value determined according to SINR (Signal to Interference plus Noise Ratio)/geometry of a UE. In this case, the geometry and the SINR may correspond to the same concept. Or, when a reference TTI length is configured, the TTI length may correspond to a value which is configured according to power capable of being assigned to a corresponding UL carrier. For example, when power is restricted by power which is guaranteed by a UE by supporting dual connectivity and the like, although geometry is good, it may be able to configure a reference TTI length by a longer TTI.

Proposal 4: when TDD (Time Division Duplex) is performed or PUSCH and PUCCH are transmitted by TDM, it may assume that duration of PUCCH is determined irrespective of carrier aggregation at the time of transmitting UCI. However, a TTI for which PUCCH is transmitted is identical to a TTI for which PUSCH is transmitted and the TTI for which PUCCH is transmitted is determined according to a TTI for which DCI is transmitted.

Proposal 5: A UL TTI can be fixed irrespective of a DL TTI length set to a UE, when sTTI operation is set (or irrespective of the sTTI operation). For example, a UL TTI length (for at least PUCCH transmission) may correspond to 1 OFDM symbol.

Case 2: DL CA & UL CA case

Proposal 1: A representative cell (a cell in which UCI is to be transmitted) is defined or promised in advance according to a TTI length, is configured via higher layer signaling, or is indicated using DCI. UCI on cells corresponding to each TTI length can be transmitted on (s)PUCCH in each representative cell. Or, a representative cell (a cell in which UCI is to be transmitted) is defined or promised in advance according to a TTI group, is configured via higher layer signaling, or is indicated using DCI. UCI on cells corresponding to each TTI group can be transmitted on (s)PUCCH in each representative cell. As an example of TTI grouping, a group 1 can be configured by a cell of which a TTI length ≤3 (e.g., 1 TTI=3 symbols) and a group 2 can be configured by a cell of which a TTI length ≥4 (e.g., 1 TTI=4 symbols). A TTI length of UL transmission can be configured according to a TTI group or a UL carrier group. Similar to the proposal 3 of the case 1, the TTI length can be configured according to geometry, and the like. For example, in the foregoing description, a group may correspond to a TAG (timing advance group), a CG (cell group) of dual access, or a PUCCH cell group of PUCCH offloading. In case of using a different TTI length between groups, assume that UCI multiplexing between the groups is crossed or PUSCH scheduling by cross-carrier is not performed.

Proposal 2: All UCI are transmitted via a Pcell PUCCH. In this case, it may be able to define a rule that an sTTI is not set to the Pcell.

Proposal 3: A linkage is established between a DL cell and a UL cell in advance and UCI (e.g., HARQ-ACK for PDSCH transmitted in each DL cell) on the DL cell is transmitted via (s)PUCCH of the UL cell linked with the DL cell. This is aimed for avoiding excessive increase of a payload size.

Proposal 4: Partial UCI is transmitted via sPUCCH of a UL cell corresponding to sTTI and the remaining UCI can be transmitted via PUCCH of a UL cell corresponding to a normal TTI. More generally, a plurality of UCIs can be transmitted in a manner of being divided using a plurality of UL cells having a different TTI length.

Proposal 5: If a specific UL cell is scheduled, HARQ-ACK can be transmitted in a manner of being piggybacked using sPUCCH of the UL cell and CSI can be transmitted in a manner of being piggybacked using sPUSCH of the UL cell. Or, if a specific UL cell is scheduled, HARQ-ACK+CSI can be transmitted in a manner of being piggybacked using sPUSCH of the UL cell. In this case, whether to perform piggyback can be determined according to a TTI length of a cell.

Case 3: DL non-CA & UL CA

Proposal 1: UCI can be transmitted using a UL cell defined or promised in advance or a UL cell explicitly or implicitly indicated via higher layer/physical layer signaling.

Proposal 2: UCI can be transmitted using a UL cell corresponding to a TTI length defined or promised in advance or a TTI length explicitly or implicitly indicated via higher layer/physical layer signaling.

UCI Transmission for Multiple Cells having Different TTI Lengths

When UCI on a plurality of cells (e.g., a plurality of HARQ-ACK or a plurality of HARQ-ACK+CSI) are transmitted, if the transmission is supported by an sTTI, since a payload size is not sufficient, it may bring about degraded UCI transmission performance Hence, when transmission timing for UCI (e.g., multi-HARQ-ACK(s) or multi-HARQ-ACK(s)+multi-CSI(s)) on a plurality of cells is the same, a method for a UE to transmit UCI within sTTI is proposed.

TDM is Performed on UCI of Cells Different from Each Other

UCI as much as "the predefined number of cells" or UCI as much as "the maximum number of cells satisfying a prescribed coding rate in consideration of payload" are preferentially included in sPUCCH transmission in an ascending order of cell indexes (or in a descending order of cell indexes or for cells selected according to a predefined/predetermined rule only) and UCI on the remaining cells can be offloaded to a next TTI (or a TTI appearing after predetermined time). For example, when HARQ-ACK transmission timing of cells 1 and 2 corresponds to a TTI #n, HARQ-ACK for the cell 1 is transmitted at the TTI #n and HARQ-ACK for the cell 2 is transmitted at TTI #n+1.

Or, UCI of a higher priority can be preferentially included in sPUCCH transmission according to a priority of the UCI and the remaining UCI can be offloaded to a next TTI (or a TTI appearing after predetermined time).

Or, a higher priority is assigned to a cell of a short (or long) TTI and UCI on the cell of the higher priority is preferentially included in (s)PUCCH transmission and the remaining UCI can be offloaded to a next TTI (or a TTI appearing after predetermined time).

In the foregoing description, a coding rate for determining the number of UCI can be differently configured according to a TTI length or a TTI group. The coding rate can be defined or promised in advance or can be set to a UE via higher layer/physical layer signaling. In this case, a single TTI group can be defined by a set of multiple TTI lengths different from each other.

When the Same PUCCH Resource is Set to HARQ-ACK(s) for a Plurality of Cells, Method of Performing Scheduling If HARQ-ACK resource for PDSCH of a different cell is set to a different PUCCH resource, excessive reservation of resources can be required. In order to avoid the excessive reservation, a HARQ-ACK resource for PDSCH of a different cell is linked with the same PUCCH resource and a UE does not expect that the cells are to be scheduled at the same time. Or, the UE does not expect that the cells are scheduled to have a HARQ-ACK transmission timing collision. Or, if the HARQ-ACK resource for PDSCH of a different cell is linked with the same PUCCH resource, the UE transmits HARQ-ACK to a corresponding PUCCH resource by applying HARQ-ACK (spatial) bundling.

Similarly, a HARQ-ACK resource for PDSCH having a different TTI length (or it may have the same TTI length in part) is linked with the same PUCCH resource and a UE does not expect that the PDSCHs are to be scheduled at the same time. Or, the UE does not expect that the PDSCHs are scheduled to have a HARQ-ACK transmission timing collision. Or, if the HARQ-ACK resource for PDSCH having a different TTI length (or it may have the same TTI length in part) is connected with a PUCCH resource, the UE transmits HARQ-ACK in a corresponding PUCCH resource by applying HARQ-ACK (spatial) bundling.

HARQ-ACK Bundling

If HARQ-ACK timing for "the predefined number of cells", HARQ-ACK timing for "the maximum number of cells satisfying a prescribed coding rate in consideration of payload", or HARQ-ACK timing for "the prescribed number of PDSCH having a different or same TTI length" is the same, a UE can apply HARQ-ACK bundling.

Or, if HARQ-ACK timing for "the predefined number of cells" or HARQ-ACK timing for "the maximum number of cells satisfying a prescribed coding rate in consideration of payload" is the same, a UE can apply bundling to HARQ-ACK of cells having a HARQ-ACK resource linked with the same PUCCH resource only.

In the foregoing description, a coding rate for determining the number of UCI can be differently configured according to a TTI length or a TTI group. The coding rate can be defined or promised in advance or can be set to a UE via higher layer/physical layer signaling. In this case, a single TTI group can be defined by a set of multiple TTI lengths different from each other.

Transmission using Normal TTI PUCCH

Proposal 1: if UCI timing for "the predefined number of cells" or UCI timing for "the maximum number of cells satisfying a prescribed coding rate in consideration of payload" is the same, the UCI can be transmitted in a manner of being offloaded to PUCCH in a specific cell among cells in which a normal TTI is managed.

Proposal 2: if UCI timing for "the predefined number of cells" or UCI timing for "the maximum number of cells satisfying a prescribed coding rate in consideration of payload" is the same, UCI as much as "the predefined number of cells" or UCI as much as "the maximum number of cells satisfying a prescribed coding rate in consideration of payload" is transmitted using sPUCCH. The remaining UCI can be dropped or can be transmitted in a manner of being offloaded to PUCCH in a specific cell among cells in which a normal TTI is managed.

In the foregoing description, a coding rate for determining the number of UCI can be differently configured according to a TTI length or a TTI group. The coding rate can be defined or promised in advance or can be set to a UE via higher layer/physical layer signaling. In this case, a single TTI group can be defined by a set of multiple TTI lengths different from each other.

In this case, in the aforementioned proposals, a normal TTI can be restricted to a specific TTI determined by sTTI for which sPUCCH is to be transmitted. For example, the normal TTI may correspond to a normal TTI starting within "x" ms or "y" sTTI from the ending timing of sTTI.

In the aforementioned proposals, a cell in which a normal TTI PUCCH is transmitted can be restricted to a Pcell. Or, a cell in which a normal TTI PUCCH is transmitted can be determined by a cell from among cells managing a plurality of normal TTIs.

Determining TTI Length and Cell for Transmitting UCI according to Total Payload Size of UCI A UE determines a TTI length for which UCI is to be transmitted according to the total payload size of the UCI. It may be able to define a rule that the UCI is to be transmitted using a specific cell among cells having the TTI length. The rule can be defined or promised in advance or can be set to a UE via higher layer/physical layer signaling.

For example, when the total payload size of UCI is greater than a bits and is equal to or less than b bits, the UCI is transmitted by a cell indicated by predefined/promised signaling among cells having a TTI length=f (e.g., 1 TTI=f number of symbols). When the total payload size of UCI is greater than b bits and is equal to or less than c bits, it may be able to define a rule that the UCI is transmitted by a cell indicated by predefined/promised signaling among cells having a TTI length=g (e.g., 1 TTI=g number of symbols).

Transmission via sPUCCH

If there is a scheduled UL cell, the UL cell can be piggybacked by (s)PUSCH. Or, the UL cell can be piggybacked using (s)PUSCH transmitted by a PUSCH resource defined/promised in advance or a PUSCH resource configured via higher layer signaling. In this case, piggybacked UCI may correspond to UCI on the entire cells or can be restricted to UCI on a partial cell. If the (s)PUSCH transmission does not exist, it may be able to transmit UCI according to one of the proposed methods.

When HARQ-ACK Timing for PDSCH having a Different TTI Length is the Same or Overlapped, a Method of Determining a UL Transmission Cell or a TTI length A UL cell or a TTI length for which HARQ-ACK is to be transmitted in response to (s)PDSCH having a specific DL TTI length can be defined or promised in advance or can be indicated via higher layer/physical layer signaling.

Or, a UL cell or a TTI length for which HARQ-ACK is to be transmitted in response to (s)PDSCH having one of DL TTI lengths constructing a specific DL TTI length group can be defined or promised in advance or can be indicated via higher layer/physical layer signaling.

It may be able to define a rule that HARQ-ACK for (s)PDSCH having the specific DL TTI length or (s)PDSCH belonging to the DL TTI length group is to be transmitted via (s)PUCCH in "the UL cell" or "a single UL cell (or a plurality of UL cells) defined/promised in advance or indicated via higher layer/physical layer signaling among UL cells to which a UL TTI length is set" or is transmitted in a manner of piggybacked to (s)PUSCH. If (s)PUCCH resource of HARQ-ACK for a plurality of (s)PDSCHs having the specific DL TTI length or belonging to the DL TTI length group is the same, UCI can be transmitted according to one of the proposed methods.

UCI Mapping Principle

UCI Mapping Method

A UCI mapping method capable of being applied according to proposals of the present invention is proposed as follows.

Proposal 1: UCI on each PDSCH can be mapped to a UL resource in an order of PDSCH starting/ending timing. Or, UCI on a cell or UCI on a TTI length can be sequentially transmitted in a manner of being mapped to a UL resource in an order of a cell index or a TTI length.

Proposal 2: It may set a limit on the number of aggregated HARQ-ACKs to make a coding rate not to exceed a prescribed coding rate in consideration of payload. When multiple HARQ-ACK(s) and multiple CSI(s) are aggregated, it may set a limit on the number of aggregated CSIs to make a coding rate not to exceed a prescribed coding rate in consideration of the remaining payload remained after HARQ-ACK is filled.

When the number of aggregated UCI is restricted, resource mapping of UCI is performed in an order of PDSCH starting/ending timing, a cell index, or a TTI length.

In the foregoing description, a coding rate for determining the number of UCI can be differently configured according to a TTI length or a TTI group. The TTI length or the TTI group can be defined or promised in advance or can be set to a UE via higher layer signaling or physical layer signaling. In this case, a TTI group can be defined by a single set including a plurality of different TTI lengths.

TTI Length Configuration

TTI Length according to Specific Cell

A TTI length to be used in a specific UL cell can be configured as follows. In the present specification, for clarity, it is described as "TTI length to be used in a specific UL cell". However, contents described in the following can be applied to a TTI length to be used in a specific UL channel transmitted in a specific UL cell only.

Proposal 1: A TTI length to be used in a specific UL cell can be configured via higher layer signaling.

Proposal 2: A TTI length to be used in a specific UL cell can be dynamically configured via UL grant DCI.

Proposal 3: A TTI length to be used in a specific UL cell can be configured by a specific value predefined/promised in a manner of being linked with a scheduling DL cell transmitting a UL grant or a TTI length value used in the DL cell.

Proposal 4: A TTI length to be used in a specific UL cell can be determined by a search space to which UL grant DCI is mapped. It may be able to define a rule that a specific TTI length is to be used in a UL cell when DCI is mapped to a specific search space.

DL & UL Transmission Timing

DL Grant & PUCCH Transmission Timing

In (s)PUCCH transmission UL cell transmitting HARQ-ACK for DL cells having a different TTI length and/or HARQ-ACK for DL cells supporting (s)PDSCH having a plurality of TTI lengths, (s)PUCCH transmission timing can be determined as follows.

If DL (s)TTI length >UL (s) TTI length is satisfied, it may be able to define a rule that (s)PUCCH including HARQ-ACK for PDSCH is to be transmitted in one of a plurality of UL (s) TTIs corresponding to the timing of the DL (s)TTI at HARQ-ACK timing on the basis of the DL (s)TTI length. Specifically, it may be able to define a rule that (s)PUCCH including HARQ-ACK for PDSCH to be transmitted in a completely overlapped UL (s)TTI and the earliest UL (s)TTI among a plurality of the UL (s)TTIs.

In this case, if the transmission timing of HARQ-ACK for (s)PDSCH having a specific DL (s)TTI length is overlapped with the transmission timing of HARQ-ACK for (s)PDSCH having a DL (s)TTI length shorter than the specific DL (s)TTI length, the HARQ-ACK for (s)PDSCH having the shorter DL (s)TTI length is preferentially transmitted and the HARQ-ACK can be transmitted in a next (s)TTI (or after prescribed time is elapsed). Or, it may transmit (s)PUCCH by applying (spatial) bundling to the HARK-ACK for (s)PDSCH having the shorter DL (s)TTI length. Or, it may be able to transmit HARQ-ACK via a separate (s)PUCCH resource configured or signaled in advance by multiplexing the HARQ-ACK with the HARQ-ACK for (s)PDSCH having the shorter DL (s)TTI length and carrying the HARQ-ACK on a single (s)PUCCH format. The present operation can be applied only when HARQ-ACK transmission timings equal to or greater than a prescribed number (e.g., 3) are overlapped.

If DL (s)TTI length<UL (s) TTI length is satisfied, it may be able to define a rule that (s)PUCCH including HARQ-ACK for PDSCH is to be transmitted in a UL (s)TTI including the DL (s)TTI or in the earliest UL (s)TTI at the HARQ-ACK timing on the basis of the DL (s)TTI length.

In this case, transmission timing for a plurality of HARQ-ACKs may correspond to a specific UL (s)TTI. In this case, HARQ-ACK for (s)PDSCH having an earliest DL (s)TTI length can be preferentially transmitted. Or, it may apply (spatial)bundling to a plurality of the HARQ-ACKs to transmit (s)PUCCH. Or, it may be able to transmit a plurality of HARQ-ACKs via a preconfigured or signaled separate (s)PUCCH resource by multiplexing a plurality of the HARQ-ACKs and carrying a plurality of the HARQ-ACKs on a single (s)PUCCH format. The present operation can be applied only when HARQ-ACK transmission timings equal to or greater than a prescribed number (e.g., 3) are overlapped.

UL Grant & PUSCH Transmission Timing

When a UL grant is transmitted in a DL cell and (s)PUSCH is transmitted in a UL cell, transmission timing of the DL cell and the UL cell can be determined as follows.

If DL (s)TTI length >UL (s)TTI length is satisfied, it may be able to define a rule that (s)PUCCH is to be transmitted in one of UL (s) TTIs corresponding to the timing of the DL (s)TTI at UL grant-to-(s)PUSCH timing on the basis of the DL (s)TTI length. Specifically, it may be able to define a rule that (s)PUSCH for a UL grant is to be transmitted in a completely overlapped UL (s)TTI and the earliest UL (s)TTI among a plurality of UL (s)TTIs.

If DL (s)TTI length<UL (s)TTI length is satisfied, it may be able to define a rule that (s)PUCCH for a UL grant is to be transmitted in a UL (s)TTI including the DL (s)TTI or in the earliest UL (s)TTI at UL grant-to-(s)PUSCH timing on the basis of the DL (s)TTI length.

Since it is able to include the examples for the proposed method as one of implementation methods of the present invention, it is apparent that the examples are considered as a sort of proposed methods. Although the embodiments of the present invention can be independently implemented, the embodiments can also be implemented in a combined/aggregated form of a part of embodiments. It may define a rule that an eNB/location server informs a UE of information on whether to apply the proposed methods (or, information on rules of the proposed methods) via a predefined signal (e.g., physical layer signal or higher layer signal).

Figure 6:
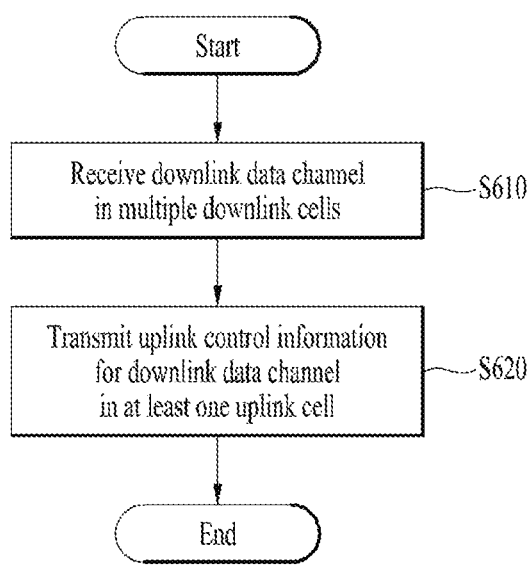
FIG. 6 is a flowchart illustrating an operation of a UE.

FIG. 6 is a flowchart illustrating an operation of a terminal.

A method of transmitting an uplink signal for a terminal configured to support one or more TTIs (transmission time intervals) in a wireless communication system according to one embodiment of the present invention is explained. The method is performed by the terminal.

A terminal may receive a downlink data channel in a plurality of downlink cells [S610]. Subsequently, the terminal may transmit uplink control information for the downlink data channel in at least one or more uplink cells [S620].

The at least one or more uplink cells may correspond to one or more downlink cells among a plurality of the downlink cells, downlink cells having the same TTI length or a TTI length belonging to a group may correspond to a signal uplink cell.

A TTI length of the at least one or more uplink cells may be configured according to the TTI length or the TTI length group of the downlink cells.

When the terminal receives a downlink control signal for uplink transmission on a specific uplink cell, the at least one uplink cell may be determined as the specific uplink cell, among the uplink control information, HARQ (hybrid automatic retransmission request)-ACK (acknowledgement) is transmitted on an uplink control channel with a short TTI of the specific uplink cell and CSI (channel state information) may be transmitted on an uplink data channel with a short TTI of the specific uplink cell.

When the terminal receives a downlink control signal for uplink transmission on a specific uplink cell, the at least one uplink cell may be determined as the specific uplink cell, and the uplink control information may be transmitted on an uplink data channel with a short TTI of the specific uplink cell.

Whether to perform transmission on the uplink data channel with the short TTI may be determined according to a TTI length of the plurality of downlink cells.

When a TTI length of a downlink cell on which the downlink data channel is received is shorter than a TTI length of an uplink cell in which uplink control information for the received downlink data channel is to be transmitted, an uplink control channel including the uplink control information can be transmitted in an uplink TTI including a TTI of the downlink cell at the timing at which the uplink control information is to be transmitted on the basis of a TTI length of the downlink cell.

When multiple uplink control informations correspond to the uplink TTI, transmission of a downlink data channel with a shortest TTI length may have a priority.

When uplink control information of two or more downlink data channel among the plurality of downlink data channels correspond to the uplink TTI, the two or more uplink control information can be transmitted in a manner of being bundled or multiplexed.

In the foregoing description, embodiments of the present invention have been briefly explained with reference to FIG. 6. An embodiment related to FIG. 6 can alternatively or additionally include at least a part of the aforementioned embodiments.

Figure 7:
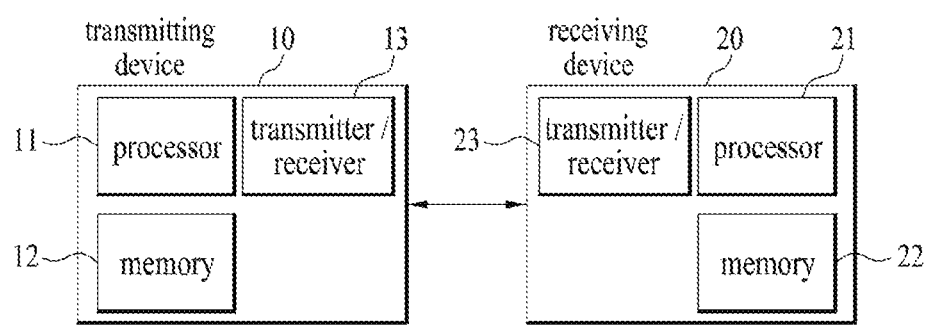
FIG. 7 is a block diagram of a device for implementing embodiment(s) of the present invention.

FIG. 7 is a block diagram of a transmitting device 10 and a receiving device 20 configured to implement exemplary embodiments of the present invention. Referring to FIG. 7, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An transmitter/receiver supporting a MIMO function of transmitting and receiving data using a plurality of antennas may be connected to two or more antennas.

The transmitting device and/or the receiving device may be configured as a combination of one or more embodiments of the present invention.

The embodiments of the present application has been illustrated based on a wireless communication system, specifically 3GPP LTE (-A), however, the embodiments of the present application can be applied to any wireless communication system in which interferences exist.

It will be apparent to those skilled in the art that various modifications and variations can be made in the present invention without departing from the scope of the inventions. Thus, it is intended that the present invention covers the modifications and variations of this invention provided they come within the scope of the appended claims and their equivalents.

INDUSTRIAL APPLICABILITY

The present invention is applicable to wireless communication devices such as a terminal, a relay, and a base station.

What is claimed is:

1. A method of transmitting an uplink signal, which is transmitted by a terminal configured to support one or more Transmission Time Interval (TTI) lengths in a wireless communication system, comprising:
   receiving a downlink data channel in a plurality of downlink cells; and
   transmitting uplink control information for the downlink data channel in at least one uplink cell,
   wherein the at least one uplink cell corresponds to one or more of the plurality of downlink cells and wherein downlink cells of a same TTI length or a TTI length belonging to a group correspond to a single uplink cell,
   wherein, responsive to determining that the terminal receives a downlink control signal for uplink transmission on a specific uplink cell, the at least one uplink cell is determined as the specific uplink cell, and
   wherein the uplink control information is transmitted on an uplink data channel with a short TTI of the specific uplink cell.

2. The method of claim 1, wherein, responsive to determining that the terminal receives a downlink control signal for uplink transmission on a specific uplink cell, the at least one uplink cell is determined as the specific uplink cell,
   wherein HARQ (hybrid automatic retransmission request)-ACK (acknowledgement) among the uplink control information is transmitted on an uplink control channel with a short TTI of the specific uplink cell, and wherein CSI (channel state information) is transmitted on an uplink data channel with a short TTI of the specific uplink cell.

3. The method of claim 2, wherein whether or not a transmission is performed on the uplink data channel of the short TTI is determined according to TTI lengths of the plurality of downlink cells.

4. The method of claim 1, wherein, responsive to determining that a TTI length of a downlink cell on which the downlink data channel is received is shorter than a TTI length of an uplink cell in which uplink control information for the received downlink data channel is to be transmitted, an uplink control channel including the uplink control information is transmitted in an uplink TTI containing a TTI of the downlink cell at the uplink control information transmission timing based on the TTI length of the downlink cell.

5. The method of claim 4, wherein, responsive to determining that a plurality of uplink control information correspond to the uplink TTI, a transmission of a downlink data channel with a shortest TTI length has a priority.

6. The method of claim 4, wherein, responsive to determining that uplink control information of two or more downlink data channels among the plurality of downlink data channels correspond to the uplink TTI, the two or more uplink control information are transmitted in a manner of being bundled or multiplexed.

7. A terminal configured to support one or more Transmission Time Interval (TTI) lengths and transmit an uplink signal in a wireless communication system, comprising:
   a transmitter and a receiver; and
   a processor that controls the transmitter and the receiver, the processor receives a downlink data channel in a plurality of downlink cells, transmits uplink control information for the downlink data channel in at least one uplink cell,
   wherein the at least one uplink cell corresponds to one or more of the plurality of downlink cells and wherein downlink cells of a same TTI length or a TTI length belonging to a group correspond to a single uplink cell,
   wherein, responsive to determining that the terminal receives a downlink control signal for uplink transmission on a specific uplink cell, the at least one uplink cell is determined as the specific uplink cell, and
   wherein the uplink control information is transmitted on an uplink data channel with a short TTI of the specific uplink cell.

8. The terminal of claim 7, wherein, responsive to determining that the terminal receives a downlink control signal for uplink transmission on a specific uplink cell, the at least one uplink cell is determined as the specific uplink cell, wherein HARQ (hybrid automatic retransmission request)-ACK (acknowledgement) among the uplink control information is transmitted on an uplink control channel of a short TTI of the specific uplink cell, and wherein CSI (channel state information) is transmitted on an uplink data channel with a short TTI of the specific uplink cell.

9. The terminal of claim 8, wherein whether or not a transmission is performed on the uplink data channel of the short TTI is determined according to TTI lengths of the plurality of downlink cells.

10. The terminal of claim 7, wherein, responsive to determining that a TTI length of a downlink cell in which the downlink data channel is received is shorter than a TTI length of an uplink cell in which uplink control information for the received downlink data channel is to be transmitted, an uplink control channel including the uplink control information is transmitted in an uplink TTI including a TTI of the downlink cell at the uplink control information transmission timing based on of the TTI length of the downlink cell.

11. The terminal of claim 10, wherein, responsive to determining that a plurality of uplink control information correspond to the uplink TTI, a transmission of a downlink data channel with a shortest TTI length has a priority.

12. The terminal of claim 10, wherein, responsive to determining that uplink control information of two or more downlink data channels among the plurality of downlink data channels correspond to the uplink TTI, the two or more uplink control information are transmitted in a manner of being bundled or multiplexed.

* * * * *